(12) United States Patent
Stainer et al.

(10) Patent No.: US 9,062,993 B2
(45) Date of Patent: Jun. 23, 2015

(54) METHOD AND APPARATUS FOR LIQUID FLOW CALIBRATION CHECK

(71) Applicant: E I DU PONT DE NEMOURS AND COMPANY, Wilmington, DE (US)

(72) Inventors: Matthew Stainer, Goleta, CA (US); Nugent Truong, Ventura, CA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 141 days.

(21) Appl. No.: 13/899,853

(22) Filed: May 22, 2013

(65) Prior Publication Data

US 2013/0327422 A1    Dec. 12, 2013

Related U.S. Application Data

(60) Provisional application No. 61/650,173, filed on May 22, 2012.

(51) Int. Cl.
| | | |
|---|---|---|
| *G01F 25/00* | (2006.01) | |
| *G05D 7/00* | (2006.01) | |
| *G01F 1/00* | (2006.01) | |
| *B41J 2/07* | (2006.01) | |
| *B41J 2/175* | (2006.01) | |
| *G05D 7/06* | (2006.01) | |

(52) U.S. Cl.
CPC ... *G01F 1/00* (2013.01); *B41J 2/07* (2013.01); *G01F 25/0007* (2013.01); *G05D 7/0664* (2013.01); *B41J 2/175* (2013.01)

(58) Field of Classification Search
CPC . G01F 25/0007; G05D 7/0641; G05D 7/0664
USPC .................................. 137/1, 883; 73/1.35
See application file for complete search history.

(56) References Cited

U.S. PATENT DOCUMENTS

| | | | | |
|---|---|---|---|---|
| 5,932,812 | A * | 8/1999 | Delsing ...................... | 73/861.02 |
| 6,670,645 | B2 | 12/2003 | Grushin et al. | |
| 6,875,524 | B2 | 4/2005 | Hartwar et al. | |
| 8,104,323 | B2 * | 1/2012 | Yasuda ......................... | 73/1.35 |
| 8,210,022 | B2 * | 7/2012 | Moriya et al. ................ | 73/1.35 |
| 8,707,754 | B2 * | 4/2014 | Cruse et al. .................... | 73/1.35 |
| 2002/0179149 | A1* | 12/2002 | Ohmi et al. ................ | 137/487.5 |
| 2004/0102577 | A1 | 5/2004 | Hsu et al. | |
| 2004/0127637 | A1 | 7/2004 | Hsu et al. | |
| 2005/0158577 | A1 | 7/2005 | Ishibashi et al. | |
| 2005/0205860 | A1 | 9/2005 | Hsu et al. | |

(Continued)

FOREIGN PATENT DOCUMENTS

| | | |
|---|---|---|
| WO | 03/008424 A1 | 1/2003 |
| WO | 03/040257 A1 | 5/2003 |
| WO | 03/063555 A1 | 7/2003 |

(Continued)

OTHER PUBLICATIONS

CRC Handbook of Chemistry and Physics, $81^{st}$ Edition, (2000-2001), Book Not Included.

(Continued)

*Primary Examiner* — John Fox

(57) ABSTRACT

A liquid flow calibration check system applied to a multi-port printer is presented to determine whether full calibration of the multi-port printer is required to obtain accurate mass flow rates within conduits of the multi-port printer.

13 Claims, 2 Drawing Sheets

(56) References Cited

U.S. PATENT DOCUMENTS

2007/0233412 A1* 10/2007 Gotoh et al. .................. 702/100
2009/0095364 A1* 4/2009 Itoh et al. ..................... 137/861

FOREIGN PATENT DOCUMENTS

| WO | 03/091688 A2 | 11/2003 |
|---|---|---|
| WO | 03/091688 A3 | 11/2003 |
| WO | 2004/016710 A1 | 2/2004 |
| WO | 2009/018009 A1 | 2/2009 |

OTHER PUBLICATIONS

Kirk-Othmer Encyclopedia of Chemical Technology, 4$^{th}$ Edition, vol. 18, pp. 837-860, 1996, Y. Wang, Book Not Included.

G. Gustafsson, "Flexible Light-Emitting Diodes Made From Soluble Conducting Polymers", Nature, vol. 357, pp. 477-479, Jun. 11, 1992.

* cited by examiner

METHOD AND APPARATUS FOR LIQUID FLOW CALIBRATION CHECK

BACKGROUND INFORMATION

1. Field of the Disclosure

This disclosure relates in general to flow calibration check of several liquid flow streams and its use in multi-port printing devices.

2. Description of the Related Art

Printing liquid materials to form layers in electronic devices requires careful control of the liquid flow rates. When applied to a multi-port printer even small variations in liquid flow rates may cause performance problems with the resulting electronic device. Calibration of the multi-port printer, while necessary, can be time consuming and reduce throughput in a manufacturing operation. To achieve consistent performance existing calibration methods include use of a mass balance to collect liquid over a defined time period to obtain the mass flow rate, and repeating this procedure at selected intervals to ensure the mass flow rate is not varying with time. This mass balance method must be repeated for each port of the multi-port printer, and can require 20 to 30 minutes per port.

Another calibration method involves the production of complete electronic devices, followed by testing the completed electronic device for functionality and uniform operation. In the instance where the electronic device is an Organic Light Emitting Diode (OLED), uniform luminance of the OLED can provide evidence of uniformity of the flow rates in the multi-port printer used to produce the OLED. This production and testing of complete electronic devices may involve a considerable amount of time.

In yet another calibration method, each port of the multi-port printer can be calibrated individually using a known steady-state flow through a flow meter using at least three distinct flow rates to establish a flow rate curve for each port. Again, the time required may exceed 20 minutes per port.

While the calibration step is important and must be conducted to ensure proper control over multi-port printing processes, when to timely conduct the calibration steps is decided in a variety of approaches. There is a continuing need for a simpler and faster method to determine when the calibration is required for multi-port printers.

SUMMARY

There is provided an apparatus and method of operating the apparatus to determine when calibration is required for each port, or select ports, of a multi-port printer. A reference mass flow controller is alternately connected to each port of the multi-port printer, and each port is in communication with a mass flow controller unique to each port. Each mass flow controller is placed in a control mode when connected to the reference mass flow controller, and all mass flow controllers send data and receive data from a control unit. A deviation is continuously established between the reference flow controller and the mass flow controller in control mode, and this deviation is monitored and recorded for a defined time window. When the deviation is below a threshold value, the current mass flow controller is changed from control mode to closed, and the next mass flow controller is placed in control mode and connected to the reference mass flow controller. This operation is repeated for all ports of the multi-port printer.

In general, the invention features a calibration check system having a reservoir to hold liquid, a reference conduit connected to the reservoir, a reference mass flow controller in communication with the reference conduit, a manifold having at least two exit conduits, each exit conduit containing a mass flow controller (i.e. at least 5 or 15 or 30 exit conduits with associated mass flow controllers), a control unit, and the reference conduit is connected to the manifold. To achieve the calibration check a single mass flow controller is set to a control state, while closing the mass flow controllers in the other exit conduits, and liquid from the reservoir flows through the reference conduit and the exit conduit associated with mass flow controller in the control state. Data is collected and recorded by the control unit, the control unit data is associated with the reference mass flow controller and the mass flow controller in the control state, this data for each mass flow controller is compared to produce a deviation. This deviation is compared to a deviation set point (i.e. +/−0.4 µL/min at a flow rate of 120 µL/min) for a pre-set period of time (i.e. 10 minutes, or 5 minutes or 1 minute), referred to as a time window. When the deviation is less than the deviation set point the calibration check will terminate at the end of the time window. If the deviation remains greater than the deviation set point throughout the time window, a second time window is started and additional time windows are added until the deviation falls below the deviation set point or a limit for the time window repetition is reached. Upon termination of the calibration check for the mass flow controller in the control state, this mass flow controller is closed and another mass flow controller is set to the control state and the calibration check is repeated for this mass flow controller and each subsequent mass flow controller.

The liquid may be a water medium or an organic medium, either medium may contain an active material used in an OLED device. The calibration check can be applied to a multi-port printer (i.e. a printer for producing OLED devices), where each end of the exit conduits terminates in a nozzle.

The foregoing general description and the following detailed description are exemplary and explanatory only and are not restrictive of the invention, as defined in the appended claims.

BRIEF DESCRIPTION OF THE DRAWINGS

Embodiments are illustrated in the accompanying figures to improve understanding of concepts as presented herein.

Figure 1:
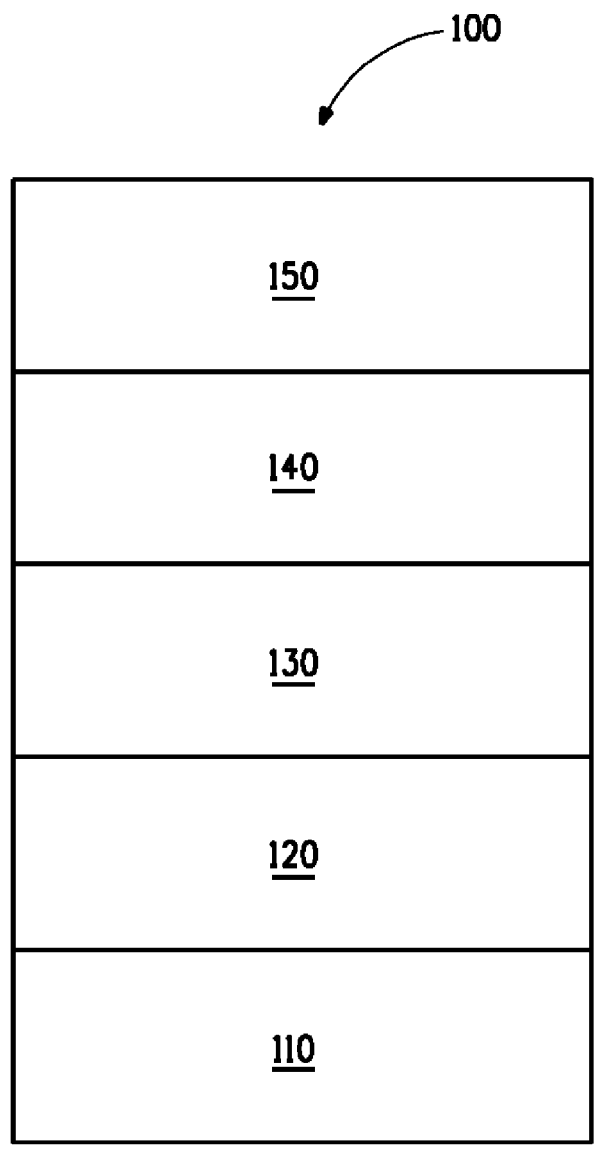
FIG. 1 is an illustration of an organic electronic device structure.

Skilled artisans appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

Many aspects and embodiments have been described above and are merely exemplary and not limiting. After reading this specification, skilled artisans appreciate that other aspects and embodiments are possible without departing from the scope of the invention.

Other features and benefits of any one or more of the embodiments will be apparent from the following detailed description, and from the claims. The detailed description first addresses Definitions and Clarification of Terms, Calibration Check Apparatus, Calibration Check Process, and Organic Electronic Device Structure.

1. Definitions and Clarification of Terms

Before addressing details of embodiments described below, some terms are defined or clarified.

The term "charge transport," when referring to a layer, material, member, or structure is intended to mean such layer, material, member, or structure facilitates migration of such charge through the thickness of such layer, material, member, or structure with relative efficiency and small loss of charge. Hole transport materials facilitate positive charge; electron transport materials facilitate negative charge. Although light-emitting materials may also have some charge transport properties, the term "charge transport layer, material, member, or structure" is not intended to include a layer, material, member, or structure whose primary function is light emission.

The term "conduit" is intended to mean a pipe, tube, or casing structure to direct a liquid from a first location to a second location.

The term "control unit" is intended to mean a logic unit for receiving and sending data that can operate a set of instructions to automate a desired process, a computer being one example.

The term "dopant" is intended to mean a material, within a layer including a host material, that changes the electronic characteristic(s) or the targeted wavelength(s) of radiation emission, reception, or filtering of the layer compared to the electronic characteristic(s) or the wavelength(s) of radiation emission, reception, or filtering of the layer in the absence of such material.

The term "host material" is intended to mean a material, usually in the form of a layer, to which a dopant may be added. The host material may or may not have electronic characteristic(s) or the ability to emit, receive, or filter radiation.

The terms "luminescent material" and "emitter" are intended to mean a material that emits light when activated by an applied voltage (such as in a light-emitting diode or light-emitting electrochemical cell). The term "blue luminescent material" is intended to mean a material capable of emitting radiation that has an emission maximum at a wavelength in a range of approximately 445-490 nm. The term "green luminescent material" is intended to mean a material capable of emitting radiation that has an emission maximum at a wavelength in a range of approximately 495-570 nm. The term "orange luminescent material" is intended to mean a material capable of emitting radiation that has an emission maximum at a wavelength in a range of approximately 590-620 nm. The term "red luminescent material" is intended to mean a material capable of emitting radiation that has an emission maximum at a wavelength in a range of approximately 620-750 nm. The term "yellow luminescent material" is intended to mean a material capable of emitting radiation that has an emission maximum at a wavelength in a range of approximately 570-590 nm.

The term "layer" is used interchangeably with the term "film" and refers to a coating covering a desired area. The term is not limited by size. The area can be as large as an entire device or as small as a specific functional area such as the actual visual display, or as small as a single sub-pixel. Layers and films can be formed by any conventional deposition technique, including vapor deposition, liquid deposition (continuous and discontinuous techniques), and thermal transfer. Continuous deposition techniques, include but are not limited to, spin coating, gravure coating, curtain coating, dip coating, slot-die coating, spray coating, and continuous nozzle coating or printing. Discontinuous deposition techniques include, but are not limited to, ink jet printing, gravure printing, and screen printing.

The term "mass flow controller" is intended to mean combination of a flow meter and a valve to measure and control flow of a material, where the mass flow controller may be located within a conduit or outside the conduit.

The term "organic electronic device" or sometimes just "electronic device" is intended to mean a device including one or more organic semiconductor layers or materials.

The term "photoactive" refers to a material or layer that emits light when activated by an applied voltage (such as in a light emitting diode or chemical cell) or responds to radiant energy and generates a signal with or without an applied bias voltage (such as in a photodetector or a photovoltaic cell).

The term "reservoir" is intended to mean a tank or vessel having one or more inlets or outlets, for holding a material.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the disclosed subject matter hereof, is described as consisting essentially of certain features or elements, in which embodiment features or elements that would materially alter the principle of operation or the distinguishing characteristics of the embodiment are not present therein. A further alternative embodiment of the described subject matter hereof is described as consisting of certain features or elements, in which embodiment, or in insubstantial variations thereof, only the features or elements specifically stated or described are present.

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Group numbers corresponding to columns within the Periodic Table of the elements use the "New Notation" convention as seen in the *CRC Handbook of Chemistry and Physics,* $81^{st}$ Edition (2000-2001).

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the organic light-emitting diode display, photodetector, photovoltaic cell, and semiconductive member arts.

2. Calibration Check Apparatus

Figure 2:
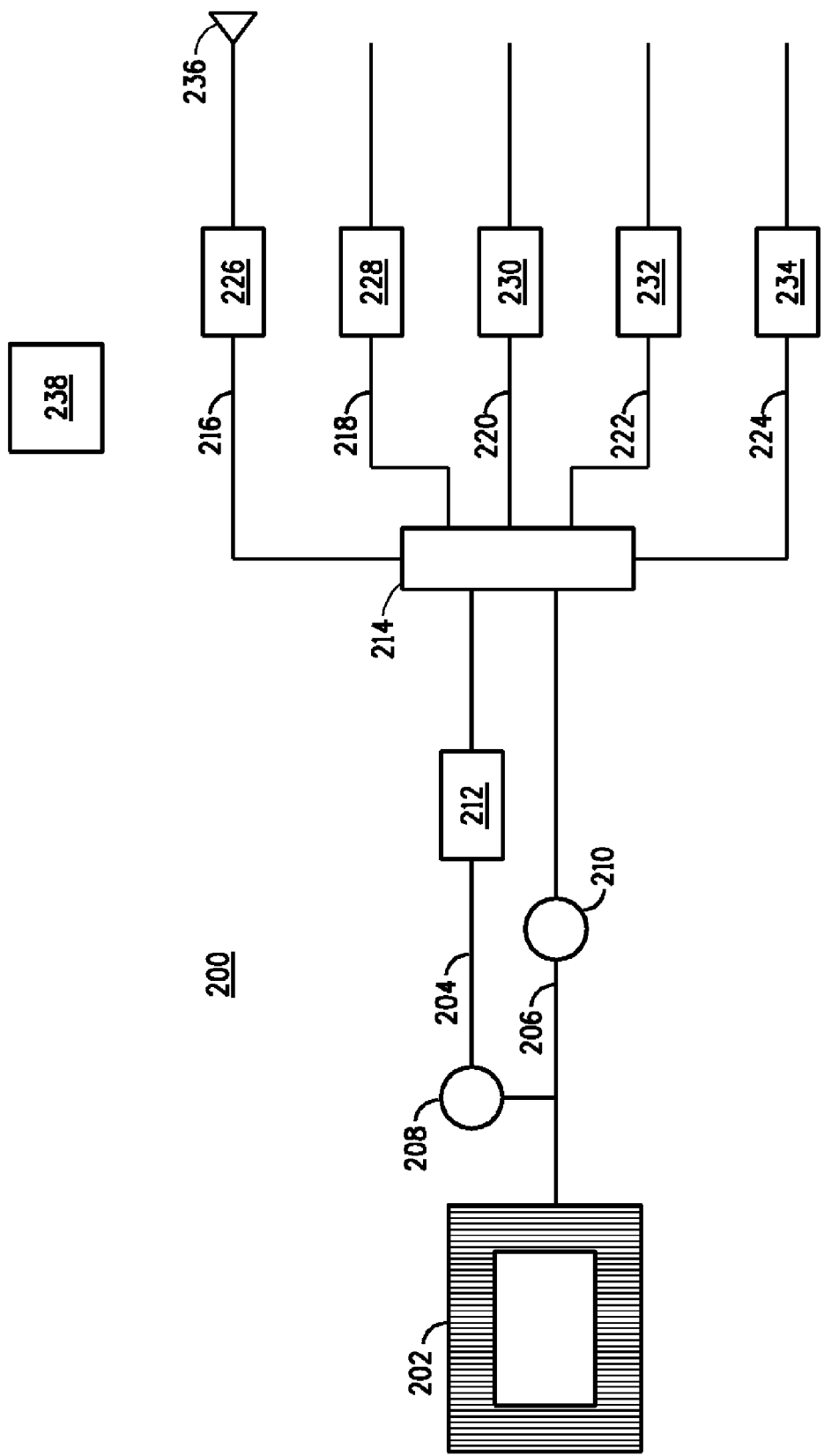
FIG. 2 is an illustration of a flow calibration check apparatus for multi-port printing of the present invention.

FIG. 2 is an illustration of a calibration check apparatus for multi-port printing of the present invention. A calibration check system 200 for a multi-port printing apparatus is shown. A reservoir 202 is connected to a reference conduit 204 and a supply conduit 206. However, the reference conduit 204 and supply conduit 206 can be alternatively connected individually to the reservoir 202. A reference valve 208 can open or close the flow of liquid from the reservoir 202 through the reference conduit 204. A supply valve 210 can open or close the flow of liquid from the reservoir 202 through the supply conduit 206. A reference mass flow controller 212 is in communication with reference conduit 204, and located along any point in the reference conduit 204. A manifold 214 has an inlet portion in which the distal ends of reference conduit 204 and supply conduit 206 enter the manifold 214. The manifold 214 has an outlet portion having a first exit conduit 216, a second exit conduit 218, a third exit conduit 220, a fourth exit conduit 222, and a fifth exit conduit 224. Alternatively, the number of exit conduits can be at least two, and the number can extend beyond 30 exit conduits. The first exit conduit 216 has a first mass flow controller 226 in communication with the first exit conduit 216; the second exit conduit 218 has a second mass flow controller 228 in communication with the second exit conduit 228; the third exit conduit 220 has a third mass flow controller 230 in communication with the third exit conduit 230; the fourth exit conduit 222 has a fourth mass flow controller 232 in communication with the fourth exit conduit 222; the fifth exit conduit 224 has a fifth mass flow controller 234 in communication with the fifth exit conduit 224. Each of these exit conduits may terminate with a nozzle 236, as shown at the distal end of the first exit conduit 216. While FIG. 2 indicates five exit conduits, in another embodiment there may be at least 15 exit conduits, in another embodiment there may be at least 30 conduits. A control unit 238 can send data and receive data from all the elements within the calibration check system 200 via wired (not shown) or wireless connection.

Embodiments of the reference mass flow controller 212, and mass flow controllers 226-234 can be obtained from Lintec, Ltd. of Otsu City, Shiga, Japan, and Horiba Ltd. of Kyoto, Japan. In one embodiment, mass flow rates can be 0.07 to 0.2 grams/minute.

4. Calibration Check Process

The control unit 238 operates the following automated operation. The first mass flow controller 226 is set to a control state, supply valve 210 is closed while reference valve 208 is open, and mass flow controllers 228-234 are off. Liquid from reservoir 202 flows through reference conduit 204, into manifold 214 and through first exit conduit 216. Data from the reference mass flow controller 212 and first mass flow controller 226 are collected and recorded by the control unit 238. A deviation is established between the mass flow rates of reference mass flow controller 212 and first mass flow controller 226. This deviation is measured for an established time window and compared to a deviation set point, where deviation values below the deviation set point are deemed acceptable. If the deviation has reached the deviation set point, or is below the deviation set point at the end of the time window, the calibration check of the first mass flow controller 226 is terminated at the end of the time window. Alternatively, the calibration check can be terminated at the time the deviation has reached the deviation set point, or is below the deviation set point. If the deviation remains above the deviation set point during the time window, a successive time window is started. This comparison of deviation and deviation set point is continued for the successive time window, and repeated for additional time windows. A limit is placed on the number of repeated time windows, and the comparison of deviation and deviation set point will terminate upon reaching the limit. Alternatively, the time window can slide back in time (i.e. to capture the end of one time window and the beginning of the next time window) to capture the trend of the deviation toward the set point. Data is sent to the control unit 238 indicating the limit for repeating the time windows has been reached without the deviation being below the deviation set point, and this mass flow controller is identified as not having reached the set point. At this point the mass flow controller can be scheduled for another calibration check or a full calibration can be scheduled.

Upon reaching the termination of the calibration check of the first mass flow controller 226, second mass flow controller 228 is set to the control state and first mass flow controller 226 is off. The above process is repeated until each mass flow controller in each respective exit conduit receives a calibration check. Full calibration of the mass flow controllers can be limited to the mass flow controllers which did not obtain a deviation below the deviation set point, all of the mass flow controllers, or any combination thereof. The calibration check process is simpler and faster than the full calibration of the mass flow controllers, and the calibration check process can form an alternative to conducting full calibration of all mass flow controllers at regular scheduled intervals of time or production cycles.

In one embodiment, all of the mass flow controllers associated with the exit conduits may be subjected to the calibration check, in another embodiment any combination or any single mass flow controller can be subjected to the calibration check. In one embodiment there may be several reservoirs 202, each having respective calibration check system 200, and these calibration check systems 200 may be operated simultaneously or in any combination. In one example, three reservoirs 202 (not shown) may contain, respectively, a liquid having a red emissive material, a liquid having a blue emissive material, and a liquid having a green emissive material, used in production of OLED devices.

In one embodiment the time window is 5 minutes or less, in another embodiment the time window is 2 minutes or less, in another embodiment the time window is 1 minute or less.

In one embodiment the limit for repeating the time window is 10, in another embodiment 6, in another embodiment 4, and in another embodiment 2.

In one embodiment the deviation set point is +/−0.4 µL/minute at a flow rate of 120 µL/minute.

In one embodiment the liquid flow can be maintained in the reference conduit 204 when switching calibration from one mass flow controller to another mass flow controller, in another embodiment the liquid flow can be stopped when switching calibration from one mass flow controller to another mass flow controller.

5. Organic Electronic Device Structure

Organic electronic devices that may benefit from having the described calibration check system 200 include, but are not limited to, (1) devices that convert electrical energy into radiation (e.g., a light-emitting diode, light emitting diode display, lighting device, luminaire, or diode laser), (2) devices that detect signals through electronics processes (e.g., photodetectors, photoconductive cells, photoresistors, photoswitches, phototransistors, phototubes, IR detectors, biosensors), (3) devices that convert radiation into electrical energy, (e.g., a photovoltaic device or solar cell), and (4) devices that include one or more electronic components that include one or more organic semi-conductor layers (e.g., a transistor or diode).

One illustration of an organic electronic device structure is shown in FIG. 1. The device 100 has a first electrical contact layer, an anode layer 110 and a second electrical contact layer, a cathode layer 160, and a photoactive layer 140 between them. Adjacent to the anode is a hole injection layer 120. Adjacent to the hole injection layer is a hole transport layer 130, comprising hole transport material. Adjacent to the cathode may be an electron transport layer 150, comprising an electron transport material. As an option, devices may use one or more additional hole injection or hole transport layers (not shown) next to the anode 110 and/or one or more additional electron injection or electron transport layers (not shown) next to the cathode 160.

Layers 120 through 150 are individually and collectively referred to as the active layers.

In some embodiments, the photoactive layer is pixellated, (not shown). Each of the pixel or subpixel units represents a different color. In some embodiments, the subpixel units are for red, green, and blue. Although three subpixel units are typical, two or more than three may be used.

In some embodiments, the different layers have the following range of thicknesses: anode 110, 500-5000 Å, In some embodiments 1000-2000 Å; hole injection layer 120, 50-2000 Å, In some embodiments 200-1000 Å; hole transport layer 120, 50-2000 Å, In some embodiments 200-1000 Å; photoactive layer 130, 10-2000 Å, In some embodiments 100-1000 Å; layer 140, 50-2000 Å, In some embodiments 100-1000 Å; cathode 150, 200-10000 Å, In some embodiments 300-5000 Å. The location of the electron-hole recombination zone in the device, and thus the emission spectrum of the device, can be affected by the relative thickness of each layer. The desired ratio of layer thicknesses will depend on the exact nature of the materials used.

a. Photoactive Layer

In some embodiments, the photoactive layer comprises a host material and a compound as a dopant.

In some embodiments, the photoactive layer comprises a first host material, a second host material, and a compound as dopant.

In some embodiments, the photoactive layer consists essentially of a host material and a compound as a dopant.

In some embodiments, the photoactive layer consists essentially of a first host material, a second host material, and a compound as a dopant.

In some embodiments, the weight ratio of dopant to total host material is in the range of 1:99 to 40:60; in some embodiments 5:95 to 30:70; in some embodiments, 10:90 to 20:80.

In some embodiments, the host has a triplet energy level higher than that of the dopant, so that it does not quench the emission. In some embodiments, the host is selected from the group consisting of carbazoles, indolocarbazoles, triazines, aryl ketones, phenylpyridines, pyrimidines, phenanthrolines, triarylamines, deuterated analogs thereof, combinations thereof, and mixtures thereof.

In some embodiments, the photoactive layer is intended to emit white light.

In some embodiments, the photoactive layer comprises a host, one or more additional dopants emitting different colors, so that the overall emission is white.

In some embodiments, the photoactive layer consists essentially of a host, a first dopant, and a second dopant, where the second dopant emits a different color than the first dopant.

In some embodiments, the emission color of the second dopant is yellow.

In some embodiments, the photoactive layer consists essentially of a host, a first dopant, a second dopant, and a third dopant.

In some embodiments, the emission color of the second dopant is red and the emission color of the third dopant is green.

Any kind of electroluminescent ("EL") material can be used as dopants. EL materials include, but are not limited to, small molecule organic fluorescent compounds, luminescent metal complexes, conjugated polymers, and mixtures thereof. Examples of fluorescent compounds include, but are not limited to, chrysenes, pyrenes, perylenes, rubrenes, coumarins, anthracenes, thiadiazoles, derivatives thereof, arylamino derivatives thereof, and mixtures thereof. Examples of metal complexes include, but are not limited to, metal chelated oxinoid compounds, such as tris(8-hydroxyquinolato)aluminum (Alq3); cyclometalated iridium and platinum electroluminescent compounds, such as complexes of iridium with phenylpyridine, phenylquinoline, or phenylpyrimidine ligands as disclosed in Petrov et al., U.S. Pat. No. 6,670,645 and Published PCT Applications WO 03/063555 and WO 2004/016710, and organometallic complexes described in, for example, Published PCT Applications WO 03/008424, WO 03/091688, and WO 03/040257, and mixtures thereof. Examples of conjugated polymers include, but are not limited to poly(phenylenevinylenes), polyfluorenes, poly(spirobifluorenes), polythiophenes, poly(p-phenylenes), copolymers thereof, and mixtures thereof.

Examples of red, orange and yellow light-emitting materials include, but are not limited to, complexes of Ir having phenylquinoline or phenylisoquinoline ligands, periflanthenes, fluoranthenes, and perylenes. Red light-emitting materials have been disclosed in, for example, U.S. Pat. No. 6,875,524, and published US application 2005-0158577.

In some embodiments, the second and third dopants are cyclometallated complexes of Ir or Pt.

b. Other Device Layers

The other layers in the device can be made of any materials which are known to be useful in such layers.

The anode 110 is an electrode that is particularly efficient for injecting positive charge carriers. It can be made of, for example materials containing a metal, mixed metal, alloy, metal oxide or mixed-metal oxide, or it can be a conducting polymer, and mixtures thereof. Suitable metals include the Group 11 metals, the metals in Groups 4, 5, and 6, and the Group 8-10 transition metals. If the anode is to be light-transmitting, mixed-metal oxides of Groups 12, 13 and 14 metals, such as indium-tin-oxide, are generally used. The anode may also comprise an organic material such as polyaniline as described in "Flexible light-emitting diodes made from soluble conducting polymer," Nature vol. 357, pp 477 479 (11 Jun. 1992). At least one of the anode and cathode should be at least partially transparent to allow the generated light to be observed.

The hole injection layer 120 comprises hole injection material and may have one or more functions in an organic electronic device, including but not limited to, planarization of the underlying layer, charge transport and/or charge injection properties, scavenging of impurities such as oxygen or metal ions, and other aspects to facilitate or to improve the performance of the organic electronic device. The hole injection layer can be formed with polymeric materials, such as polyaniline (PANI) or polyethylenedioxythiophene (PEDOT), which are often doped with protonic acids. The protonic acids can be, for example, poly(styrenesulfonic acid), poly(2-acrylamido-2-methyl-1-propanesulfonic acid), and the like.

The hole injection layer can comprise charge transfer compounds, and the like, such as copper phthalocyanine and the tetrathiafulvalene-tetracyanoquinodimethane system (TTF-TCNQ).

In some embodiments, the hole injection layer comprises at least one electrically conductive polymer and at least one fluorinated acid polymer.

In some embodiments, the hole injection layer is made from an aqueous dispersion of an electrically conducting polymer doped with a colloid-forming polymeric acid. Such materials have been described in, for example, published U.S. patent applications US 2004/0102577, US 2004/0127637, US 2005/0205860, and published PCT application WO 2009/018009.

Examples of hole transport materials for layer 130 have been summarized for example, in Kirk-Othmer Encyclopedia of Chemical Technology, Fourth Edition, Vol. 18, p. 837-860, 1996, by Y. Wang. Both hole transporting molecules and polymers can be used. Commonly used hole transporting molecules are: N,N'-diphenyl-N,N'-bis(3-methylphenyl)-[1,1'-biphenyl]-4,4'-diamine (TPD), 1,1-bis[(di-4-tolylamino)phenyl]cyclohexane (TAPC), N,N'-bis(4-methylphenyl)-N,N'-bis(4-ethylphenyl)-[1,1'-(3,3'-dimethyl)biphenyl]-4,4'-diamine (ETPD), tetrakis-(3-methylphenyl)-N,N,N',N'-2,5-phenylenediamine (PDA), a-phenyl-4-N,N-diphenylaminostyrene (TPS), p-(diethylamino)benzaldehyde diphenylhydrazone (DEH), triphenylamine (TPA), bis[4-(N,N-diethylamino)-2-methylphenyl](4-methylphenyl)methane (MPMP), 1-phenyl-3-[p-(diethylamino)styryl]-5-[p-(diethylamino)phenyl]pyrazoline (PPR or DEASP), 1,2-trans-bis(9H-carbazol-9-yl)cyclobutane (DCZB), N,N,N',N'-tetrakis(4-methylphenyl)-(1,1'-biphenyl)-4,4'-diamine (TTB), N,N'-bis(naphthalen-1-yl)-N,N'-bis-(phenyl)benzidine (NPB), and porphyrinic compounds, such as copper phthalocyanine. In some embodiments, the hole transport layer comprises a hole transport polymer. In some embodiments, the hole transport polymer is a distyrylaryl compound. In some embodiments, the aryl group has two or more fused aromatic rings. In some embodiments, the aryl group is an acene. The term "acene" as used herein refers to a hydrocarbon parent component that contains two or more ortho-fused benzene rings in a straight linear arrangement. Other commonly used hole transporting polymers are polyvinylcarbazole, (phenylmethyl)-polysilane, and polyaniline. It is also possible to obtain hole transporting polymers by doping hole transporting molecules such as those mentioned above into polymers such as polystyrene and polycarbonate. In some cases, triarylamine polymers are used, especially triarylamine-fluorene copolymers. In some cases, the polymers and copolymers are crosslinkable.

In some embodiments, the hole transport layer further comprises a p-dopant. In some embodiments, the hole transport layer is doped with a p-dopant. Examples of p-dopants include, but are not limited to, tetrafluorotetracyanoquinodimethane (F4-TCNQ) and perylene-3,4,9,10-tetracarboxylic-3,4,9,10-dianhydride (PTCDA).

Examples of electron transport materials which can be used for layer 150 include, but are not limited to, metal chelated oxinoid compounds, including metal quinolate derivatives such as tris(8-hydroxyquinolato)aluminum (AlQ), bis(2-methyl-8-quinolinolato)(p-phenylphenolato)aluminum (BAlq), tetrakis-(8-hydroxyquinolato)hafnium (HfQ) and tetrakis-(8-hydroxyquinolato)zirconium (ZrQ); and azole compounds such as 2-(4-biphenylyl)-5-(4-t-butylphenyl)-1,3,4-oxadiazole (PBD), 3-(4-biphenylyl)-4-phenyl-5-(4-t-butylphenyl)-1,2,4-triazole (TAZ), and 1,3,5-tri(phenyl-2-benzimidazole)benzene (TPBI); quinoxaline derivatives such as 2,3-bis(4-fluorophenyl)quinoxaline; phenanthrolines such as 4,7-diphenyl-1,10-phenanthroline (DPA) and 2,9-dimethyl-4,7-diphenyl-1,10-phenanthroline (DDPA); and mixtures thereof. In some embodiments, the electron transport layer further comprises an n-dopant. N-dopant materials are well known. The n-dopants include, but are not limited to, Group 1 and 2 metals; Group 1 and 2 metal salts, such as LiF, CsF, and $Cs_2CO_3$; Group 1 and 2 metal organic compounds, such as Li quinolate; and molecular n-dopants, such as leuco dyes, metal complexes, such as $W_2(hpp)_4$ where hpp=1,3,4,6,7,8-hexahydro-2H-pyrimido-[1,2-a]-pyrimidine and cobaltocene, tetrathianaphthacene, bis(ethylenedithio)tetrathiafulvalene, heterocyclic radicals or diradicals, and the dimers, oligomers, polymers, dispiro compounds and polycycles of heterocyclic radical or diradicals.

The cathode 160, is an electrode that is particularly efficient for injecting electrons or negative charge carriers. The cathode can be any metal or nonmetal having a lower work function than the anode. Materials for the cathode can be selected from alkali metals of Group 1 (e.g., Li, Cs), the Group 2 (alkaline earth) metals, the Group 12 metals, including the rare earth elements and lanthanides, and the actinides. Materials such as aluminum, indium, calcium, barium, samarium and magnesium, as well as combinations, can be used.

Alkali metal-containing inorganic compounds, such as LiF, CsF, $Cs_2O$ and $Li_2O$, or Li-containing organometallic compounds can also be deposited between the organic layer 150 and the cathode layer 160 to lower the operating voltage. This layer, not shown, may be referred to as an electron injection layer.

It is known to have other layers in organic electronic devices. For example, there can be a layer (not shown) between the anode 110 and hole injection layer 120 to control the amount of positive charge injected and/or to provide bandgap matching of the layers, or to function as a protective layer. Layers that are known in the art can be used, such as copper phthalocyanine, silicon oxy-nitride, fluorocarbons, silanes, or an ultra-thin layer of a metal, such as Pt. Alternatively, some or all of anode layer 110, active layers 120, 130, 140, and 150, or cathode layer 160, can be surface-treated to increase charge carrier transport efficiency. The choice of materials for each of the component layers is preferably determined by balancing the positive and negative charges in the emitter layer to provide a device with high electroluminescence efficiency.

It is understood that each functional layer can be made up of more than one layer.

c. Device Fabrication

The device layers can be formed by any deposition technique, or combinations of techniques, including vapor deposition, liquid deposition, and thermal transfer.

In some embodiments, the device is fabricated by liquid deposition of the hole injection layer, the hole transport layer, and the photoactive layer, and by vapor deposition of the anode, the electron transport layer, an electron injection layer and the cathode.

The hole injection layer can be deposited from any liquid medium in which it is dissolved or dispersed and from which it will form a film. In some embodiments, the liquid medium consists essentially of one or more organic solvents. In some embodiments, the liquid medium consists essentially of water or water and an organic solvent. The hole injection material can be present in the liquid medium in an amount from 0.5 to 10 percent by weight. The hole injection layer can be applied by any continuous or discontinuous liquid deposition technique. In some embodiments, the hole injection layer is applied by spin coating. In some embodiments, the hole injection layer is applied by ink jet printing. In some embodiments, the hole injection layer is applied by continuous nozzle printing. In some embodiments, the hole injection layer is applied by slot-die coating. After liquid deposition, the liquid medium can be removed in air, in an inert atmosphere, or by vacuum, at room temperature or with heating.

The hole transport layer can be deposited from any liquid medium in which it is dissolved or dispersed and from which it will form a film. In some embodiments, the liquid medium consists essentially of one or more organic solvents. In some embodiments, the liquid medium consists essentially of water or water and an organic solvent. In some embodiments the organic solvent is an aromatic solvent. In some embodiments, the organic liquid is selected from chloroform, dichloromethane, chlorobenzene, dichlorobenzene, toluene, xylene, mesitylene, anisole, aromatic ethers, aromatic esters, and mixtures thereof. The hole transport material can be present in the liquid medium in a concentration of 0.2 to 2 percent by weight.

The hole transport layer can be applied by any continuous or discontinuous liquid deposition technique. In some embodiments, the hole transport layer is applied by spin coating. In some embodiments, the hole transport layer is applied by ink jet printing. In some embodiments, the hole transport layer is applied by continuous nozzle printing. In some embodiments, the hole transport layer is applied by slot-die coating. After liquid deposition, the liquid medium can be removed in air, in an inert atmosphere, or by vacuum, at room temperature or with heating.

The photoactive layer can be deposited from any liquid medium in which it is dissolved or dispersed and from which it will form a film. In some embodiments, the liquid medium consists essentially of one or more organic solvents. In some embodiments, the liquid medium consists essentially of water or water and an organic solvent. In some embodiments the organic solvent is an aromatic solvent. In some embodiments, the organic solvent is selected from chloroform, dichloromethane, toluene, anisole, 2-butanone, 3-pentanone, butyl acetate, acetone, xylene, mesitylene, chlorobenzene, tetrahydrofuran, diethyl ether, trifluorotoluene, aromatic ethers, aromatic esters, and mixtures thereof. The photoactive material can be present in the liquid medium in a concentration of 0.2 to 2 percent by weight. Other weight percentages of photoactive material may be used depending upon the liquid medium.

The photoactive layer can be applied by any continuous or discontinuous liquid deposition technique. In one embodiment the multi-port printer using the calibration check system 200 can be used to deposit a photoactive material in the liquid medium. In some embodiments, the photoactive layer is applied by ink jet printing. In some embodiments, the photoactive layer is applied by continuous nozzle printing. In some embodiments, the photoactive layer is applied by slot-die coating. After liquid deposition, the liquid medium can be removed in air, in an inert atmosphere, or by vacuum, at room temperature or with heating.

In some embodiments, the electron transport layer is formed by vapor deposition. The electron transport layer can be deposited by any vapor deposition method. In some embodiments, it is deposited by thermal evaporation under vacuum.

In some embodiments, the electron injection layer is formed by vapor deposition. The electron injection layer can be deposited by any vapor deposition method. In some embodiments, it is deposited by thermal evaporation under vacuum.

In some embodiments, the cathode is formed by vapor deposition. The cathode can be deposited by any vapor deposition method. In some embodiments, it is deposited by thermal evaporation under vacuum.

Note that not all of the activities described above in the general description are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

What is claimed is:

1. A method comprising:
   providing a reservoir for a liquid, a reference conduit connected to the reservoir, a reference mass flow controller in communication with the reference conduit, a manifold having at least a first and a second exit conduit, a first mass flow controller in communication with the first exit conduit and a second mass flow controller in communication with the second exit conduit, a control unit, wherein the reference conduit is connected to the manifold;
   a) setting the first mass flow controller to control state;
   b) activating liquid flow through the reference conduit and the first exit conduit;
   c) collecting and recording data from the first mass flow controller and the reference mass flow controller;
   d) comparing data from the first mass flow controller and the reference mass flow controller to establish a deviation;
   e) establishing a time window for measuring the deviation;
   f) establishing a deviation set point;
   g) comparing the deviation to the deviation set point during the time window, if the deviation is less than the deviation set point then stop collecting and recording data at the end of the time period, if the deviation is greater than the deviation set point throughout the time window then continue collecting and recording data for additional time windows until reaching a limit for repeating the time window;

h) changing the first mass flow controller from control state to closed; and i) repeating steps a) through h) for each mass flow controller.

2. The method of claim 1 wherein the time window is 5 minutes or less.

3. The method of claim 1 wherein the time window is 2 minutes or less.

4. The method of claim 1 wherein the time window is 1 minute or less.

5. The method of claim 1 wherein the number of mass flow controllers is at least 5.

6. The method of claim 5 wherein the number of mass flow controllers is at least 15.

7. The method of claim 5 wherein the number of mass flow controllers is at least 30.

8. The method of claim 1 further comprising:

setting the limit for repeating the number of time windows in step g), wherein the limit may be fixed or vary for one or more ports.

9. The method of claim 1 wherein the deviation set point is +/−0.4 μL/min at a flow rate of 120 μL/min.

10. The method of claim 1 wherein the liquid contains an active material.

11. The method of claim 10 wherein the liquid contains a water medium.

12. The method of claim 10 wherein the liquid contains an organic medium.

13. The method of claim 1 wherein activating the liquid flow through the reference conduit can be a continuous liquid flow when setting mass flow controllers to the control state.

* * * * *